(12) United States Patent
Kuwabara

(10) Patent No.: US 12,703,776 B2
(45) Date of Patent: Aug. 11, 2026

(54) FOAMED PARTICLES OF AROMATIC POLYESTER RESIN, PRODUCTION METHOD THEREFOR, MOLDED FOAM, AND MEMBER FOR VEHICLE

(71) Applicant: SEKISUI KASEI CO., LTD., Osaka (JP)

(72) Inventor: Yusuke Kuwabara, Osaka (JP)

(73) Assignee: SEKISUI KASEI CO., LTD., Osaka (JP)

( * ) Notice: Subject to any disclaimer, the term of this patent is extended or adjusted under 35 U.S.C. 154(b) by 303 days.

(21) Appl. No.: 18/281,897

(22) PCT Filed: Mar. 9, 2022

(86) PCT No.: PCT/JP2022/010186
§ 371 (c)(1),
(2) Date: Sep. 13, 2023

(87) PCT Pub. No.: WO2022/196473
PCT Pub. Date: Sep. 22, 2022

(65) Prior Publication Data

US 2024/0158598 A1 May 16, 2024

(30) Foreign Application Priority Data

Mar. 17, 2021 (JP) ................................ 2021-044095

(51) Int. Cl.
*C08J 9/228* (2006.01)
*B29B 9/06* (2006.01)
(Continued)

(52) U.S. Cl.
CPC ............... *C08J 9/228* (2013.01); *B29B 9/065* (2013.01); *B29C 48/0012* (2019.02);
(Continued)

(58) Field of Classification Search
None
See application file for complete search history.

(56) References Cited

U.S. PATENT DOCUMENTS

2014/0227506 A1 8/2014 Kuwabara et al.
2021/0189089 A1 6/2021 Hayashi et al.

FOREIGN PATENT DOCUMENTS

EP 2 564 799 3/2013
EP 2 567 799 3/2013
(Continued)

OTHER PUBLICATIONS

International Search Report issued May 24, 2022 in International (PCT) Application No. PCT/JP2022/010186.

*Primary Examiner* — Yan Lan
(74) *Attorney, Agent, or Firm* — Wenderoth, Lind & Ponack, L.L.P.

(57) ABSTRACT

An object of the present invention is to provide an aromatic polyester-based resin foam molded product having excellent mechanical properties, foamed aromatic polyester-based resin particles for producing the foam molded product, or a method for producing the foamed particles. The present invention relates to foamed aromatic polyester-based resin particles, wherein crystallinity (A) in a particle central portion and crystallinity (B) in a particle surface layer are both 10% or less, and a ratio of the crystallinity in the surface layer to the crystallinity in the central portion (B/A) is 0.3 to 1.4.

8 Claims, 6 Drawing Sheets

(51) Int. Cl.

| | |
|---|---|
| ***B29C 48/00*** | (2019.01) |
| ***B29C 48/395*** | (2019.01) |
| ***B29C 48/88*** | (2019.01) |
| ***B29K 67/00*** | (2006.01) |
| ***C08J 9/14*** | (2006.01) |
| ***C08J 9/18*** | (2006.01) |

(52) U.S. Cl.

CPC ........ *B29C 48/0022* (2019.02); *B29C 48/022* (2019.02); *B29C 48/397* (2019.02); *B29C 48/919* (2019.02); *C08J 9/141* (2013.01); *C08J 9/18* (2013.01); *B29K 2067/003* (2013.01); *C08J 2201/03* (2013.01); *C08J 2203/14* (2013.01); *C08J 2367/02* (2013.01)

(56) References Cited

FOREIGN PATENT DOCUMENTS

| | | |
|---|---|---|
| JP | 2014-43528 | 3/2014 |
| JP | 5974010 | 8/2016 |
| JP | 2017-43011 | 3/2017 |
| WO | 2020/049802 | 3/2020 |

FOAMED PARTICLES OF AROMATIC POLYESTER RESIN, PRODUCTION METHOD THEREFOR, MOLDED FOAM, AND MEMBER FOR VEHICLE

TECHNICAL FIELD

The present invention relates to foamed aromatic polyester-based resin particles for in-mold foam molding and a method for producing the same, a foam molded product, and an automobile component.

BACKGROUND ART

A general method conventionally used to produce an aromatic polyester-based resin foam molded product by foaming foamed particles made of an aromatic polyester-based resin is in-mold foam molding. In-mold foam molding is a molding method including: a step of filling a mold with foamed resin particles; and a step of heating the foamed resin particles filled in the mold using a heating medium such as hot water or water vapor to secondary-foam the foamed resin particles, so that the obtained secondary foamed particles are heat-fused and integrated with each other, whereby an in-mold foam molded product having a desired shape is produced.

Foamed particles made of an aromatic polyester-based resin are produced by extruding a base resin melted and kneaded in an extruder and simultaneously foaming the base resin in the presence of a foaming agent. In this case, a hot cutting method, an underwater cutting method (in-water cutting method), or the like is used.

In PTL 1, foamed aromatic polyester-based resin particles are produced by a water ring hot cutting method, that is, a method of cutting a melted and kneaded resin extruded under a gas, and cooling the cut particles with cooling water.

In PTL 2, foamed aromatic polyester-based resin particles are produced by an underwater cutting method, that is, a method of cutting and cooling an extruded melted and kneaded resin in water.

CITATION LIST

Patent Literature

PTL 1: JP5974010B

PTL 2: European Patent Application Publication No. 2564799

SUMMARY OF INVENTION

Technical Problem

The method for producing foamed particles of PTL 1 can produce foamed particles that can be stored for a long period of time after production. However, it has been difficult to increase the mechanical strength of foam molded products obtained from the foamed particles obtained by this production method.

In the method for producing foamed particles of PTL 2, the cut resin particles become foamed particles and are immediately released into water at about 80° C. to be cooled. However, according to the present inventors, the foamed particles produced by this method have poor secondary foaming properties and need to be improved in terms of moldability.

An object of the present invention is to provide an aromatic polyester-based resin foam molded product having excellent mechanical properties. Another object of the present invention is to provide foamed aromatic polyester-based resin particles for producing the foam molded product. Another object of the present invention is to provide a method for producing the foamed particles.

Solution to Problem

The present inventors found that the surface resin of the foamed particles obtained by the production method of PTL 1 has a remarkably large thickness, which causes poor secondary foaming properties of the foamed particles. The present inventors also found that the foamed particles obtained by the production method of PTL 2 have poor secondary foaming properties because the surface resin of the foamed particles has a remarkably large thickness, the crystallinity of the surface layer resin is considerably larger than that of the central resin of the foamed particles, and the central portion of the foamed particles has a large average cell diameter, which is largely different from the average cell diameter of the surface layer.

More specifically, the present inventors found that since the aromatic polyester-based resin is a crystalline resin, an overly high crystallinity of the foamed particles may reduce the fusibility when the secondary foamed particles are integrated by heat fusion. The present inventors also found that when the thickness of the resin layer on the surface of the foamed particles is too large, the secondary foaming properties are reduced, and the surface elongation of the molded article and the fusibility of the secondary foamed particles in the foam molded product are deteriorated. Furthermore, the present inventors found that when the difference between the average cell diameter in the central portion and the average cell diameter in the surface layer of the foamed particles is too large, stress concentration to cells is likely to occur during compression of the foam molded product, and the mechanical properties of the foam molded product are reduced.

The present inventors focused on the thickness of the resin on the surface of the foamed particles, the crystallinity of the foamed particles, the cell diameter of the foamed particles, and the like, and found that the thickness, crystallinity, and cell diameter of the surface resin of foamed particles obtained by adjusting the temperature of cooling water to a specific range in a water ring hot cutting method can be set within specific ranges, that the foamed particles have excellent secondary foaming properties, and that a foam molded product obtained by foam-molding of the foamed particles has excellent mechanical properties such as compressive strength and bending strength. Thus, the present invention has been completed.

The present invention typically includes the following aspects.

Item 1.

Foamed aromatic polyester-based resin particles, wherein crystallinity (A) in a particle central portion and crystallinity (B) in a particle surface layer are both 10% or less, and a ratio of the crystallinity in the surface layer to the crystallinity in the central portion (B/A) is 0.30 to 1.40.

Item 2.

The foamed aromatic polyester-based resin particles according to Item 1, wherein a resin layer of the particle surface has a thickness of 5 μm to 40 μm.

Item 3.

The foamed aromatic polyester-based resin particles according to Item 1 or 2, wherein an average cell diameter (C) in the particle central portion and an average cell diameter (D) in the particle surface layer are both 50 μm to 300 μm, and a ratio of the average cell diameter in the surface layer to the average cell diameter in the central portion (D/C) is 0.75 to 0.95.

Item 4.

The foamed aromatic polyester-based resin particles according to any one of Items 1 to 3, wherein the ratio of the crystallinity in the surface layer to the crystallinity in the particle central portion (B/A) is 0.30 to 1.30.

Item 5.

The foamed aromatic polyester-based resin particles according to any one of Items 1 to 4, wherein the crystallinity (A) in the particle central portion and the crystallinity (B) in the particle surface layer are both 1 to 10%.

Item 6.

A foam molded product of the foamed aromatic polyester-based resin particles according to any one of Items 1 to 5.

Item 7.

The foam molded product according to Item 6, which has a density of 0.05 g/cm$^3$ to 0.7 g/cm$^3$.

Item 8.

An automobile component comprising the foam molded product according to Item 6 or 7.

Item 9.

A method for producing foamed aromatic polyester-based resin particles, the method comprising the steps of:

- supplying an aromatic polyester-based resin to an extruder to melt and knead the aromatic polyester-based resin in the presence of a foaming agent;
- cutting the melted and kneaded aromatic polyester-based resin, while extrusion-foaming the resin from a nozzle die attached to a front end of the extruder under gaseous conditions, to produce particle-shaped cut products; and
- cooling the particle-shaped cut products with cooling water, the cooling water having a temperature of 23° C. to 55° C.

Advantageous Effects of Invention

According to the present invention, it is possible to provide foamed aromatic polyester-based resin particles from which a foam molded product having excellent mechanical properties can be produced, and a method for producing the foamed aromatic polyester-based resin particles. According to the present invention, it is also possible to provide a foam molded product having excellent mechanical properties such as compressive strength and bending strength, and an automobile component containing the foam molded product.

DESCRIPTION OF EMBODIMENTS

Figure 1:
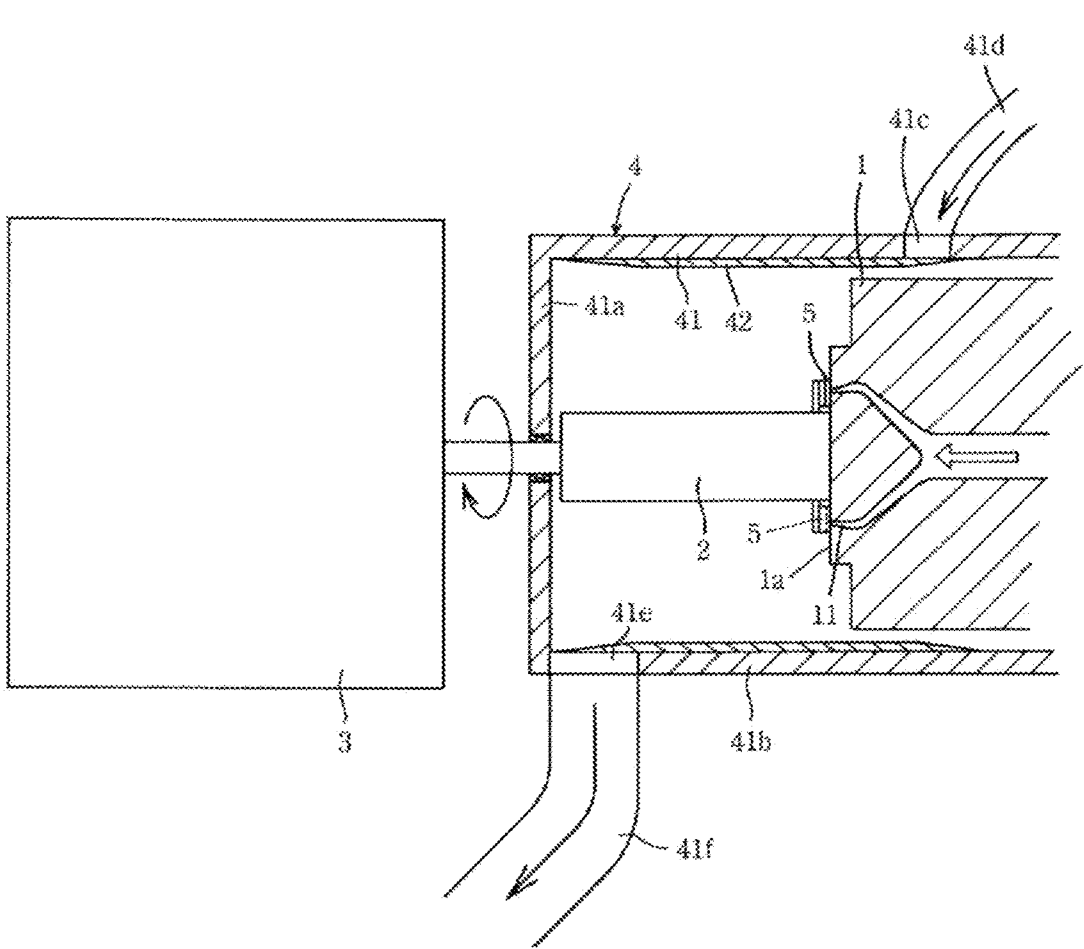
FIG. 1 is a schematic cross-sectional view illustrating an exemplary apparatus for producing foamed aromatic polyester-based resin particles.

In the present specification, the terms "comprising" and "containing" are intended to include the terms "consisting essentially of" and "consisting of."

Foamed Aromatic Polyester-Based Resin Particles

The foamed aromatic polyester-based resin particles contain the aromatic polyester-based resin as a main ingredient. The "main ingredient" means that the resin constituting the foamed aromatic polyester-based resin particles contains 80 to 100 mass %, preferably 90 to 100 mass %, of the aromatic polyester-based resin.

Aromatic Polyester-Based Resin

The aromatic polyester-based resin is a polyester containing an aromatic dicarboxylic acid component and a diol component, and examples thereof may include polyethylene terephthalate, polypropylene terephthalate, polybutylene terephthalate, polycyclohexane dimethylene terephthalate, polyethylene naphthalate, and polybutylene naphthalate. Of these, polyethylene terephthalate is preferred. Only one type of aromatic polyester-based resin may be used, or a combination of two or more types thereof may be used.

The aromatic polyester-based resin may contain, as a constituent, for example: a trivalent or higher polyvalent carboxylic acid such as a tricarboxylic acid, for example, trimellitic acid, or a tetracarboxylic acid, for example, pyromellitic acid or an anhydride thereof; or a trihydric or higher polyhydric alcohol such as a triol, for example, glycerin or a tetraol, for example, pentaerythritol, in addition to the aromatic dicarboxylic acid component and the diol component.

The aromatic polyester-based resin used may be not only a petroleum-derived material, but also a plant-derived material or a recycled material recovered and regenerated from used PET bottles.

The intrinsic viscosity (IV value) of the aromatic polyester-based resin is preferably 0.7 to 1.1, and more preferably 0.75 to 1.05, in terms of excellent extrusion foaming properties and the excellent secondary foaming properties of the obtained foamed particles.

The intrinsic viscosity (IV value) of the aromatic polyester-based resin is a value measured according to JIS K7367-5 (2000). More specifically, the aromatic polyester-based resin is dried at 40° C. and a degree of vacuum of 133 Pa for 15 hours.

0.1000 g of the aromatic polyester-based resin is collected as a sample and placed in a 20 mL volumetric flask, and about 15 mL of a solvent mixture (50% by weight of phenol and 50% by weight of 1,1,2,2-tetrachloroethane) is added to the volumetric flask. The sample in the volumetric flask is placed on a hot plate and heated to about 130° C. to melt the sample. After the sample is melted, it is cooled to room temperature, and its volume is adjusted to 20 mL to thereby produce a sample solution (sample concentration: 0.500 g/100 mL).

8 mL of the sample solution is supplied to a viscometer using a whole pipette, and the temperature of the sample is stabilized using a water bath containing water at 25° C. Then, the flow-down time of the sample is measured. To change the concentration of the sample solution, the solvent mixture is added to the viscometer in an amount of 8 mL each time and mixed with the sample solution to dilute it, and a diluted sample solution is thereby produced. Then, the flow-down time of the diluted sample solution is measured. Separately from the sample solution, the flow-down time of the solvent mixture is measured.

The intrinsic viscosity of the aromatic polyester-based resin is computed using the following computation formulas. The following values are computed using the flow-down time ($t_0$) of the solvent mixture and the flow-down time (t) of the sample solution.

$$\text{Relative viscosity}(\eta_r)=t/t_0$$

$$\text{Specific viscosity}(\eta_{sp})=(t-t_0)/t_0=\eta_r-1$$

$$\text{Reduced viscosity}=\eta_{sp}/C$$

A graph with the reduced viscosity on the vertical axis and the concentration C of the sample solution on the horizontal axis is produced using the results of measurement on different diluted sample solutions obtained by changing the concentration C (g/100 mL) of the sample solution, and the intrinsic viscosity [η] is determined from the vertical intercept obtained by extrapolation of the obtained linear relation at C=0.

$$\text{Intrinsic viscosity } [\eta] = \lim_{C\to 0} (\eta_{sp}/C)$$

The aromatic polyester-based resin constituting the foamed aromatic polyester-based resin particles may be a reformed aromatic polyester-based resin cross-linked with a cross-linking agent. A known cross-linking agent is used, and examples thereof may include dianhydrides such as pyromellitic anhydride, polyfunctional epoxy compounds, oxazoline compounds, and oxazine compounds. Only one type of cross-linking agent may be used, or a combination of two or more types may be used.

When the aromatic polyester-based resin is reformed by cross-linking with the cross-linking agent, the aromatic polyester-based resin and the cross-linking agent may be supplied to an extruder when the foamed aromatic polyester-based resin particles are produced to thereby cross-link the aromatic polyester-based resin with the cross-linking agent in the extruder. The amount of the cross-linking agent supplied to the extruder is preferably 0.01 parts by mass to 5 parts by mass, and more preferably 0.1 parts by mass to 1 part by mass, based on 100 parts by mass of the aromatic polyester-based resin, in terms of performing extrusion foaming well.

The mass average molecular weight of the aromatic polyester-based resin constituting the foamed particles of the present invention is preferably 45,000 to 100,000, and more preferably 60,000 to 90,000, in terms of excellent extrusion foaming properties and the excellent secondary foaming properties of the obtained foamed particles.

When the aromatic polyester-based resin constituting the foamed particles is a reformed aromatic polyester-based resin, the mass average molecular weight of the aromatic polyester-based resin means the mass average molecular weight of the reformed aromatic polyester-based resin.

The mass average molecular weight (Mw) of the aromatic polyester-based resin constituting the foamed particles of the present invention refers to a polystyrene (PS)-equivalent mass average molecular weight measured by a gel permeation chromatograph (GPC).

The mass average molecular weight is specifically measured in the following manner. 0.5 mL of hexafluoroisopropanol (HFIP) and 0.5 mL of chloroform are added to 5 mg of a sample in this order and dissolved (immersion time: 6.0±1.0 hr (complete dissolution)) to obtain a sample solution. After confirming that the sample is completely dissolved in the solution, the sample solution is diluted with chloroform to a volume of 10 mL, and mixed by shaking. The sample solution is filtered through a non-aqueous 0.45-μm syringe filter (produced by Shimadzu GLC Ltd.) to obtain a filtrate. The filtrate is measured using a chromatograph under the following conditions. The mass average molecular weight (Mw) is obtained from a standard polystyrene calibration curve prepared in advance.

Device used: HLC-8320GPC EcoSEC gel permeation chromatograph (with a built-in RI detector and UV detector) produced by Tosoh Corporation GPC Measurement Conditions Columns Sample Side Guard Column=TSK guard column HYXL-H (6.0 mm×4.0 cm) produced by Tosoh Corporation×1 column Measurement column=TSKgel GMHXL (7.8 mm I.D.×30 cm) produced by Tosoh Corporation×2 columns in series Reference Side Resistance tube (inner diameter: 0.1 mm×2 m)×2 tubes in series Column temperature=40° C.

Mobile phase=chloroform

Mobile phase flow rate

Sample side pump=1.0 mL/min

Reference side pump=0.5 mL/min

Detector: UV detector

Wavelength: 254 nm

Injection volume: 15 μL

Measurement time: 10 min to 32 min

Runtime: 20 min

Sampling pitch: 500 msec

The standard polystyrene samples for calibration curve used are STANDARD SM-105 and STANDARD SH-75 (product names, produced by Showa Denko K.K.) having a mass average molecular weight of U.S. Pat. Nos. 5,620,000, 3,120,000, 1,250,000, 442000, 151000, 53500, 17000, 7660, 2900, or 1320.

After the standard polystyrenes for calibration curve are grouped into A (5620000, 1250000, 151000, 17000, 2900) and B (3120000, 442000, 53500, 7660, 1320), A (2 mg, 3 mg, 4 mg, 4 mg, 4 mg) is weighed and then dissolved in 30 mL of chloroform, and B (3 mg, 4 mg, 4 mg, 4 mg, 4 mg) is weighed and then dissolved in 30 mL of chloroform. The standard polystyrene calibration curve is obtained by preparing a calibration curve (cubic formula) from the retention time obtained after injection of 50 μL of each prepared solution of A and B and measurement. The mass average molecular weight is calculated using the calibration curve.

Method for Producing Foamed Aromatic Polyester-Based Resin Particles

The foamed particles of the present invention can be produced, for example, by a production method including the steps of supplying an aromatic polyester-based resin to an extruder to melt and knead the aromatic polyester-based resin in the presence of a foaming agent, cutting the melted and kneaded aromatic polyester-based resin, while extrusion-foaming the resin from a nozzle die attached to the front end of the extruder under gaseous conditions, to produce particle-shaped cut products, and cooling the particle-shaped cut products with cooling water, the cooling water having a temperature of 23° C. to 55° C. This production method is also an aspect of the present invention. This production method will next be described, but the method of producing the foamed aromatic polyester-based resin particles of the present invention is not limited to the following method.

Figure 2:
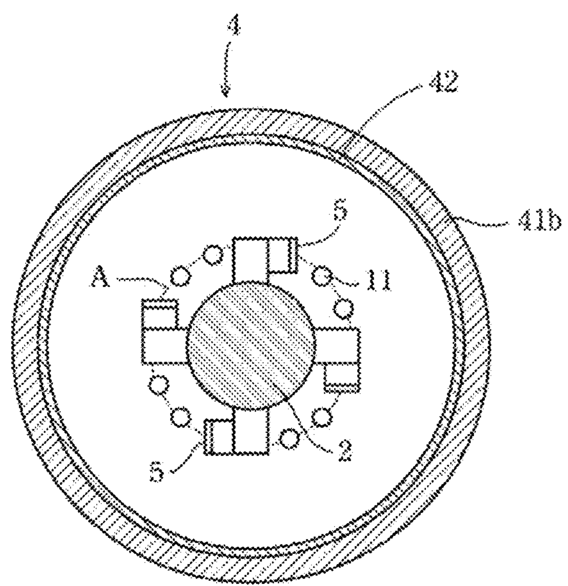
FIG. 2 is a schematic front view of a multi-nozzle die.

First, a description will be given of an exemplary production apparatus used to produce the foamed aromatic polyester-based resin particles. In FIG. 1, a nozzle die 1 is attached to the front end of an extruder. The nozzle die 1 is preferred because the aromatic polyester-based resin can be extrusion-foamed to form uniform fine cells. As shown in FIG. 2, a plurality of outlet ports 11 are formed on a front end face 1*a* of the nozzle die 2 at regular intervals on a single virtual circle A. No particular limitation is imposed on the nozzle die attached to the front end of the extruder, so long as the aromatic polyester-based resin is not foamed within the nozzles.

The number of nozzles of the nozzle die 1 is preferably 2 to 80, more preferably 5 to 60, and particularly preferably 8 to 50, in terms of production efficiency and suppression of the coalescence of particle-shaped cut products.

The diameter of the outlet ports 11 of the nozzles of the nozzle die 1 is preferably 0.2 to 2 mm, more preferably 0.3 to 1.6 mm, and particularly preferably 0.4 to 1.2 mm, because the extrusion pressure and the diameter of the foamed particles can be set in appropriate ranges.

The length of a land section of the nozzle die 1 is preferably 4 to 30 times the diameter of the outlet ports 11 of the nozzles of the nozzle die 1, and more preferably 5 to 20 times the diameter of the outlet ports 11 of the nozzles of the nozzle die 1. This is because if the length of the land section of the nozzle die is within the above range, it is advantageous in that the occurrence of fracture can be suppressed, thereby allowing stable extrusion foaming.

A rotation shaft 2 is disposed in a portion surrounded by the outlet ports 11 of the nozzles at the front end face 1*a* of the nozzle die 1 so as to protrude forward. The rotation shaft 2 passes through a front section 41*a* of a cooling drum 41 constituting a cooling component 4 described later and is connected to a driving component 3 such as a motor.

In addition, one or a plurality of rotary blades 5 are disposed integrally with the outer circumferential surface of the rear end portion of the rotation shaft 2. When the rotary blades 5 rotate, all the rotary blades 5 are always in contact with the front end face 1*a* of the nozzle die 1. When a plurality of rotary blades 5 are disposed integrally with the rotation shaft 2, the plurality of rotary blades 5 are arranged at regular intervals in the circumferential direction of the rotation shaft 2. In the example shown in FIG. 2, four rotary blades 5 are disposed integrally with the outer circumferential surface of the rotation shaft 2.

In this configuration, when the rotation shaft 2 rotates, the rotary blades 5 move on the virtual circle A on which the outlet ports 11 of the nozzles are formed while being always in contact with the front end face 1*a* of the nozzle die 1, so that the rotary blades 5 are capable of sequentially and continuously cutting the extrudates of the aromatic polyester-based resin extruded from the outlet ports 11 of the nozzles.

The cooling component 4 is disposed so as to surround the rotation shaft 2 and at least the front end portion of the nozzle die 1. The cooling component 4 includes a closed-end tubular cooling drum 41 including: a front section 41*a* having a circular front shape with a diameter larger than the diameter of the nozzle die 1; and a tubular circumferential wall section 41*b* extending rearward from the outer circumferential edge of the front section 41*a*.

A supply port 41*c* for supplying cooling water 42 is formed in a portion of the circumferential wall section 41*b* of the cooling drum 41 that corresponds to the exterior of the nozzle die 1 so as to pass through the inner and outer circumferential surfaces of the circumferential wall section 41*b*. A supply tube 41*d* for supplying the cooling water 42 to the cooling drum 41 is connected to the outer opening of the supply port 41*c* of the cooling drum 41.

In this configuration, the cooling water 42 is supplied, through the supply tube 41*d*, obliquely forward along the inner circumferential surface of the circumferential wall section 41*b* of the cooling drum 41. Then, the cooling water 42 flows forward while the cooling water 42 is caused to describe a helix along the inner circumferential surface of the circumferential wall section 41*b* of the cooling drum 41 by the centrifugal force caused by the flow rate of the cooling water 42 when it is supplied from the supply tube 41*d* to the inner circumferential surface of the circumferential wall section 41*b* of the cooling drum 41. In this configuration, while flowing along the inner circumferential surface of the circumferential wall section 41*b*, the cooling water 42 spreads gradually in a direction perpendicular to its flowing direction, so that the portion of the inner circumferential surface of the circumferential wall section 41*b* that is frontward of the supply port 41*c* of the cooling drum 41 is entirely covered with the cooling water 42.

The temperature of the cooling water is 23° C. to 55° C., more preferably 24° C. to 50° C., and particularly preferably 25° C. to 45° C., because the crystallinity of the foamed particles, the cell diameter size, or the thickness of the resin layer on the surface can be suitably adjusted.

A discharge port 41*e* is formed on the lower surface of the front end portion of the circumferential wall section 41*b* of the cooling drum 41 so as to pass through the inner and outer circumferential surfaces of the circumferential wall section 41*b*. A discharge tube 41*f* is connected to the outer opening of the discharge port 41*e*. In this configuration, the foamed aromatic polyester-based resin particles and the cooling water 42 are continuously discharged through the discharge port 41*e*.

Preferably, the foamed aromatic polyester-based resin particles are produced by extrusion foaming. For example, the aromatic polyester-based resin is supplied to the extruder and melted and kneaded in the presence of a foaming agent. Then, while the extrudates of the aromatic polyester-based resin are extrusion-foamed from the nozzle die 1 attached to the front end of the extruder, the extrudates are cut by the rotary blades 5 to thereby produce the foamed aromatic polyester-based resin particles.

No particular limitation is imposed on the extruder so long as it is a conventionally used general extruder. Examples of such an extruder may include a single-screw extruder, a twin-screw extruder, and a tandem extruder including a plurality of connected extruders.

Any conventionally used foaming agent may be used as the above foaming agent. Examples of the foaming agent may include: chemical foaming agents, such as azodicarbonamide, dinitrosopentamethylenetetramine, hydrazoyl dicarbonamide, and sodium bicarbonate; saturated aliphatic hydrocarbon-based foaming agents, such as propane, n-butane, isobutane, n-pentane, isopentane, and hexane; ether-based foaming agents, such as dimethyl ether; chlorofluorocarbon-based foaming agents, such as methyl chloride, 1,1,1,2-tetrafluoroethane, 1,1-difluoroethane, and monochlorodifluoromethane; and inorganic foaming agents, such as carbon dioxide and nitrogen. Of these, dimethyl ether, propane, n-butane, isobutane, and carbon dioxide are preferred, propane, n-propane, isobutane, and carbon dioxide are more preferred, and n-butane, isobutane, and carbon dioxide are particularly preferred. Only one type of foaming agent may be used, or a combination of two or more types may be used.

The amount of the foaming agent to be supplied to the extruder is preferably 0.1 parts by mass to 5 parts by mass, more preferably 0.2 parts by mass to 4 parts by mass, and particularly preferably 0.2 parts by mass to 3 parts by mass, based on 100 parts by mass of the aromatic polyester-based resin, in terms of easily setting the expansion ratio of the foamed particles within an appropriate range.

Preferably, a cell regulator is supplied to the extruder. The cell regulator is preferably polytetrafluoroethylene powder, polytetrafluoroethylene powder modified by an acrylic resin, talc, etc.

The amount of the cell regulator to be supplied to the extruder is preferably 0.01 parts by mass to 5 parts by mass, more preferably 0.05 parts by mass to 3 parts by mass, and particularly preferably 0.1 parts by mass to 2 parts by mass, based on 100 parts by mass of the aromatic polyester-based resin, because the cell diameter of the foamed particles can be set in an appropriate range.

The extrudates of the aromatic polyester-based resin extrusion-foamed through the nozzle die 1 are subjected to the cutting step. The extrudates of the aromatic polyester-based resin are cut by rotating the rotary blades 5 disposed on the front end face 1*a* of the nozzle die 1 by means of the rotation of the rotation shaft 2. The rotation speed of the rotary blades 5 is preferably 2,000 rpm to 10,000 rpm. Preferably, the rotary blades are rotated at constant speed.

The rotary blades 5 rotate while all the rotary blades 5 are always in contact with the front end face 1*a* of the nozzle die 1. The extrudates of the aromatic polyester-based resin extrusion-foamed through the nozzle die 1 are cut in the air at regular time intervals by shear stress generated between the rotary blades 5 and the edges of the outlet ports 11 of the nozzles of the nozzle die 1, whereby particle-shaped cut products are produced.

In the present invention, the aromatic polyester-based resin is prevented from being foamed within the nozzles of the nozzle die 1. The aromatic polyester-based resin remains unfoamed immediately after ejected from the outlet ports 11 of the nozzles of the nozzle die 1 and starts foaming a short time after ejection. Therefore, the extrudates of the aromatic polyester-based resin include unfoamed portions formed immediately after ejection from the outlet ports 11 of the nozzles of the nozzle die 1 and foamed portions that are continuous with the unfoamed portions, extruded ahead of the unfoamed portions, and being foamed.

The unfoamed portions maintain their state from ejection from the outlet ports 11 of the nozzles of the nozzle die 1 until they start foaming. The time during which the unfoamed portions are maintained can be controlled by adjusting the pressure of the resin at the outlet ports 11 of the nozzles of the nozzle die 1, the amount of the foaming agent, etc. If the pressure of the resin at the outlet ports 11 of the nozzles of the nozzle die 1 is high, the extrudates of the aromatic polyester-based resin are not foamed immediately after extrusion from the nozzle die 1 and maintain the unfoamed state. The pressure of the resin at the outlet ports 11 of the nozzles of the nozzle die 1 can be controlled by adjusting the diameter of the nozzles, the rate of extrusion, the melt viscosity of the aromatic polyester-based resin, and its melt tension. By adjusting the amount of the foaming agent to a proper amount, the aromatic polyester-based resin is prevented from being foamed within the die, so that the unfoamed portions can be formed in a reliable manner.

Since the rotary blades 5 cut the extrudates of the aromatic polyester-based resin while all the rotary blades 5 are always in contact with the front end face 1*a* of the nozzle die 1, the extrudates of the aromatic polyester-based resin are cut at the unfoamed portions formed immediately after ejection from the outlet ports 11 of the nozzles of the nozzle die 1, whereby particle-shaped cut products are produced.

As described above, the rotary blades 5 rotate at a constant rotation speed. The rotation speed of the rotary blades 5 is preferably 2,000 rpm to 10,000 rpm, more preferably 2,000 rpm to 9,000 rpm, and particularly preferably 2,000 rpm to 8,000 rpm. When the rotation speed is within the above range, it is advantageous in that cutting reliability is enhanced, or in that the coalescence of particle-shaped cut products can be suppressed.

The cutting stress by the rotary blades 5 causes the particle-shaped cut products obtained as described above to fly toward the cooling drum 41 at the same time when they are cut, and then the particle-shaped cut products immediately collide with the cooling water 42 that covers the inner circumferential surface of the circumferential wall section 41*b* of the cooling drum 41. The particle-shaped cut products continue foaming until they collide with the cooling water 42, and the foaming causes the particle-shaped cut products to grow into a substantially spherical shape. Therefore, the obtained foamed aromatic polyester-based resin particles are substantially spherical. The foamed aromatic polyester-based resin particles can be easily filled into a mold. Therefore, when the mold is filled with the foamed aromatic polyester-based resin particles to perform in-mold foaming, the foamed aromatic polyester-based resin particles can be uniformly filled into the mold, so that a uniform in-mold foam molded product can be obtained.

The inner circumferential surface of the circumferential wall section 41*b* of the cooling drum 41 is entirely covered with the cooling water 42 (23° C. to 55° C.). More specifically, the cooling water 42 is supplied, through the supply tube 41*d*, obliquely forward along the inner circumferential surface of the circumferential wall section 41*b* of the cooling drum 41. Then, the cooling water 42 flows forward while the cooling water 42 is caused to describe a helix along the inner circumferential surface of the circumferential wall section 41*b* of the cooling drum 41 by the centrifugal force caused by the flow rate of the cooling water 42 when it is supplied from the supply tube 41*d* to the inner circumferential surface of the circumferential wall section 41*b* of the cooling drum 41. Then, while flowing along the inner circumferential surface of the circumferential wall section 41*b*, the cooling water 42 spreads gradually in a direction perpendicular to its flowing direction, so that the portion of the inner circumferential surface of the circumferential wall section 41*b* that is frontward of the supply port 41*c* of the cooling drum 41 is entirely covered with the cooling water 42.

Since the particle-shaped cut products are cooled by the cooling water 42 (23° C. to 55° C.) immediately after the extrudates of the aromatic polyester-based resin are cut by the rotary blades 5 as described above, the foamed aromatic polyester-based resin particles are prevented from being foamed excessively.

Figure 3:
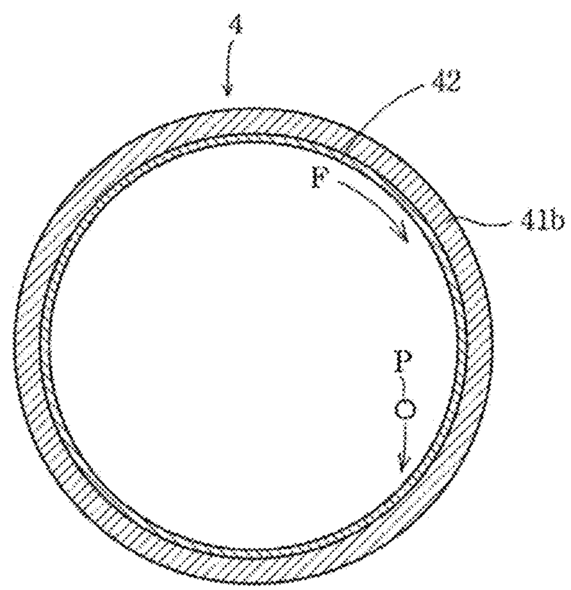
FIG. 3 is a schematic diagram illustrating a foamed aromatic polyester-based resin particle entering cooling water.
Figure 4:
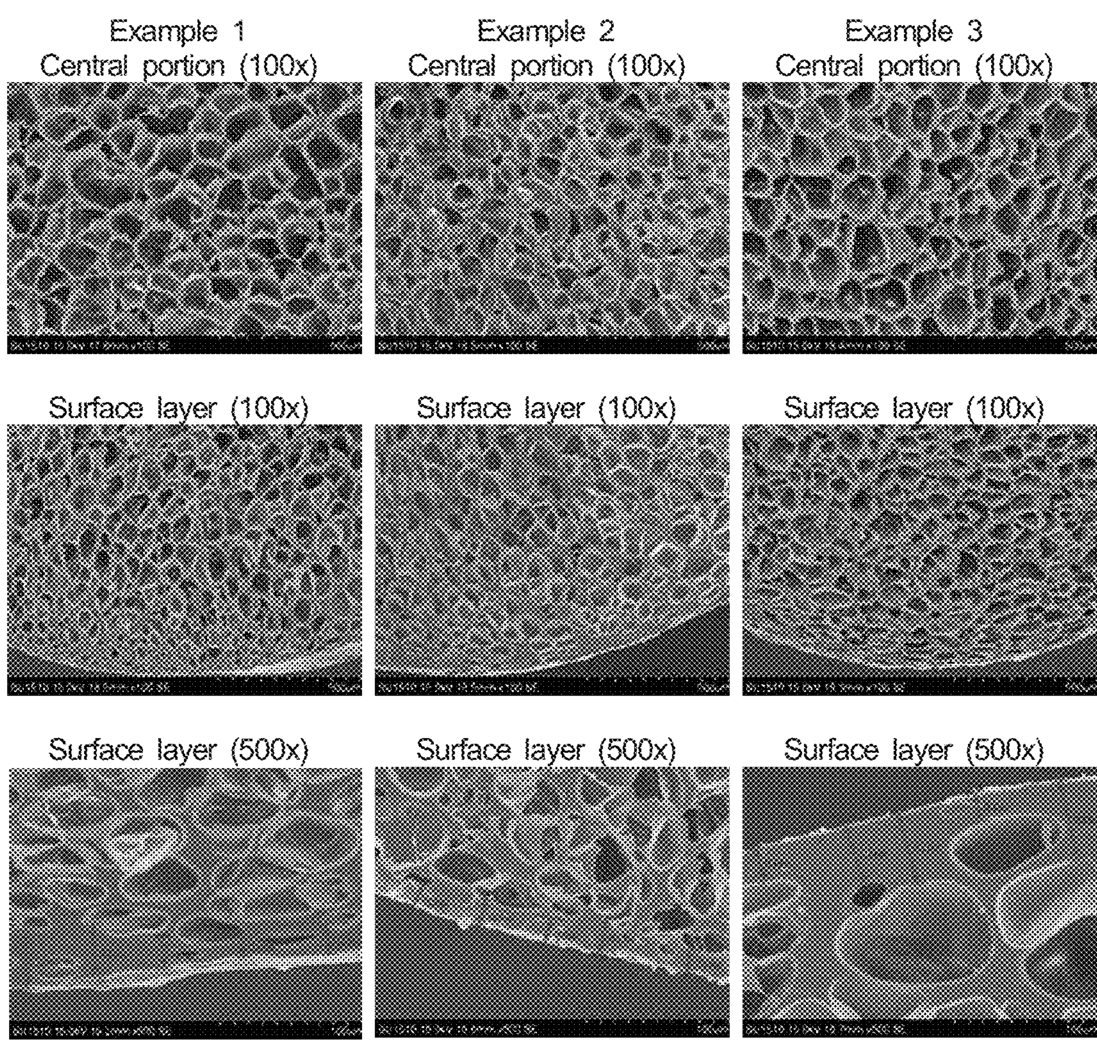
FIG. 4 shows SEM images of cross-sections of a central portion (100×) and surface layer (100× and 500×) of foamed particles produced in Examples 1 to 3.
Figure 5:
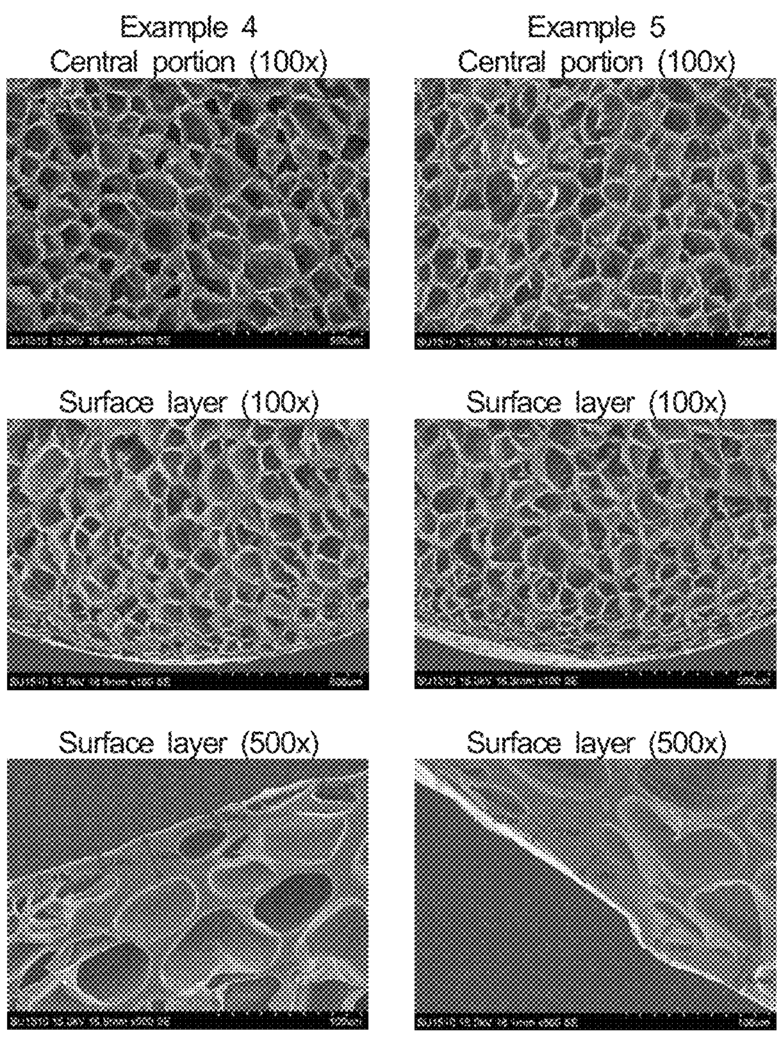
FIG. 5 shows SEM images of cross-sections of a central portion (100×) and surface layer (100× and 500×) of foamed particles produced in Examples 4 and 5.
Figure 6:
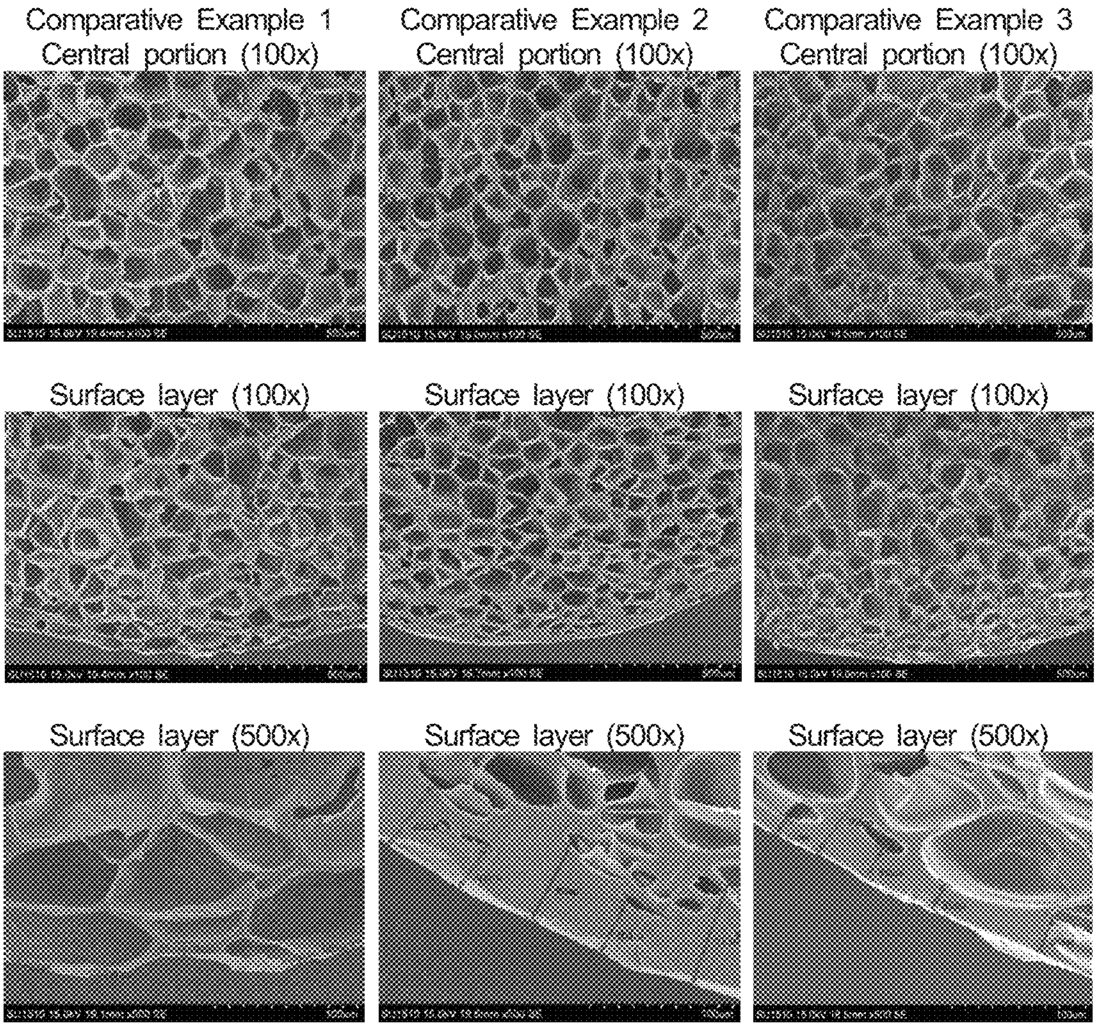
FIG. 6 shows SEM images of cross-sections of a central portion (100×) and surface layer (100× and 500×) of foamed particles produced in Comparative Examples 1 to 3.
Figure 7:
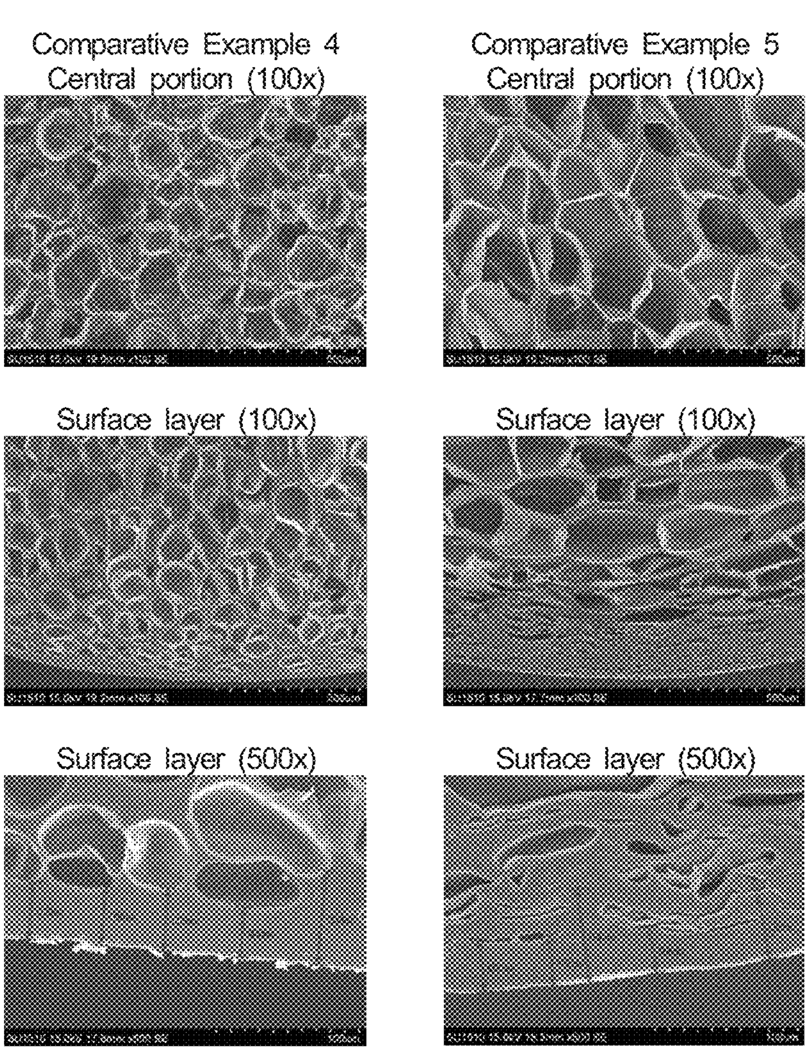
FIG. 7 shows SEM images of cross-sections of a central portion (100×) and surface layer (100× and 500×) of foamed particles produced in Comparative Examples 4 and 5.

In addition, the particle-shaped cut products obtained by cutting the extrudates of the aromatic polyester-based resin by the rotary blades 5 are caused to fly toward the cooling water 42. As described above, the cooling water 42 flowing along the inner circumferential surface of the circumferential wall section 41*b* of the cooling drum 41 flows while turning helically. Therefore, it is preferable that the particle-shaped cut products P be allowed to collide with the cooling water 42 in a direction oblique to the surface of the cooling water 42 from the upstream side of the flow of the cooling water 42 toward the downstream side and then to enter the cooling water 42 (see FIG. 3). In FIG. 3, the direction of the flow of the cooling water is denoted by "F."

As described above, when the particle-shaped cut products enter the cooling water 42, the particle-shaped cut products are caused to enter the cooling water 42 in the direction along the flow of the cooling water 42. Therefore, the particle-shaped cut products are not bounced from the surface of the cooling water 42 but enter the cooling water 42 smoothly in a reliable manner and are cooled by the cooling water 42, whereby the foamed aromatic polyester-based resin particles are produced.

Therefore, the foamed aromatic polyester-based resin particles have a substantially spherical shape with no cooling unevenness and no shrinkage and exhibit high foaming properties during in-mold foam molding. When a crystalline resin such as polyethylene terephthalate is used, the particle-shaped cut products are cooled with the cooling water 42 at 23° C. to 55° C. after the extrudates of the aromatic polyester-based resin are cut; thus, the crystallinity, the cell diameter, and the thickness of the resin layer on the surface are suitable for producing a foam molded product having excellent mechanical properties.

The bulk density of the foamed aromatic polyester-based resin particles is preferably 0.05 g/cm$^3$ to 0.7 g/cm$^3$, more preferably 0.07 g/cm$^3$ to 0.6 g/cm$^3$, and particularly preferably 0.08 g/cm$^3$ to 0.5 g/cm$^3$, in terms of improving foaming power or improving the fusion power of the secondary foamed particles. The bulk density of the foamed aromatic polyester-based resin particles can be controlled by adjusting the pressure of the resin at the outlet ports 11 of the nozzles of the nozzle die 1, the amount of the foaming agent, etc. The pressure of the resin at the outlet ports 11 of the nozzles of the nozzle die 1 can be controlled by adjusting the diameter of the nozzles, the rate of extrusion, and the melt viscosity of the aromatic polyester-based resin.

The bulk density of the foamed aromatic polyester-based resin particles is a value measured according to JIS K6911: 1995 "Testing methods for thermosetting plastics." Specifically, the bulk density is determined by the method described in the Examples.

When the crystallinity of the foamed aromatic polyester-based resin particles is high, the heat resistance of the foam molded product is improved; however, the fusion power of the secondary foamed particles is not increased, and as a result, the mechanical strength of the foam molded product is hardly improved. Therefore, both the crystallinity (A) in the central portion of the particles and the crystallinity (B) in the surface layer of the particles are preferably 10% or less, more preferably 1 to 10%, and even more preferably 2 to 8%.

The central portion and surface layer of the foamed particles are determined as follows.

The foamed particles are cut into approximately two equal parts at the center using a razor blade, a portion within a range of 20% in the radial direction of the foamed particles from the center of the particles in the exposed cross-section is defined as the central portion, and a portion within a range of 20% in the radial direction of the foamed particles from the surface of the particles in the exposed cross-section is defined as the surface layer.

The crystallinity of the foamed particles is determined by the methods described in JIS K7122: 1987 and JIS K7122: 2012. Specifically, the crystallinity of the foamed particles is determined by the method described in Examples.

The ratio (B/A) of the crystallinity (B) in the surface layer to the crystallinity (A) in the central portion of the foamed aromatic polyester-based resin particles is preferably 0.30 to 1.30, more preferably 0.35 to 1.25, and particularly preferably 0.40 to 1.20, in terms of improving foaming power or improving the fusion power of the secondary foamed particles.

The thickness of the resin layer on the surface of the foamed aromatic polyester-based resin particles is preferably 5 μm to 40 μm, and more preferably 7 μm to 37 μm, in terms of improving foaming power or improving the fusion power of the secondary foamed particles. The thickness of the resin layer on the surface of the foamed particles is determined from an image obtained by photographing the surface layer of a cross section divided into approximately two parts at the center of the foamed particles using a scanning electron microscope at a magnification of 500×. Specifically, the thickness of the resin layer is determined by the method described in the Examples.

It is preferable that the average cell diameter (C) in the central portion of the foamed aromatic polyester-based resin particles and the average cell diameter (D) in the surface layer of the particles be both 50 μm to 300 μm in terms of improving foaming power or improving the fusion power of the secondary foamed particles.

When the cell diameter of the surface layer of the foamed aromatic polyester-based resin particles is slightly smaller than the cell diameter of the central portion thereof, good foaming is achieved, and the fusion power of the secondary foamed particles is high, which is preferable. Therefore, the ratio (D/C) of the average cell diameter (D) in the surface layer to the average cell diameter (C) in the central portion of the foamed particles is preferably 0.75 to 0.95, more preferably 0.80 to 0.95, and particularly preferably 0.80 to 0.90.

By filling a cavity of a mold with the foamed aromatic polyester-based resin particles of the present invention and heating the foamed aromatic polyester-based resin particles to foam them, the secondary foamed particles obtained by foaming the foamed aromatic polyester-based resin particles are heat-fused and integrated with each other through their foaming pressure, whereby an in-mold foam molded product having excellent mechanical properties and also having a desired shape can be obtained. No particular limitation is imposed on a heating medium for the foamed aromatic polyester-based resin particles filled into the mold, and examples of the heating medium may include, in addition to water vapor, hot air and warm water.

A foam molded product of the foamed aromatic polyester-based resin particles of the present invention is also an aspect of the present invention. The foam molded product is obtained by in-mold foam molding the foamed particles of the present invention.

The density of the aromatic polyester-based resin foam molded product is preferably 0.05 g/cm$^3$ to 0.7 g/cm$^3$, more preferably 0.07 g/cm$^3$ to 0.6 g/cm$^3$, and particularly preferably 0.08 g/cm$^3$ to 0.5 g/cam, in terms of light weight and mechanical strength.

Immediately before in-mold foam molding, the foamed aromatic polyester-based resin particles may be impregnated with an inert gas to improve the foaming power of the foamed aromatic polyester-based resin particles. By improving the foaming power of the foamed aromatic polyester-based resin particles as described above, the heat-fusion bondability between the foamed aromatic polyester-based resin particles during in-mold foam molding is improved, and the obtained in-mold foam molded product has higher mechanical strength. Examples of the inert gas may include carbon dioxide, nitrogen, helium, and argon, and carbon dioxide is preferred.

Examples of the method of impregnating the foamed aromatic polyester-based resin particles with the inert gas may include a method in which the foamed aromatic polyester-based resin particles are placed in an inert gas atmosphere with a pressure equal to or higher than atmospheric pressure to impregnate the foamed aromatic polyester-based resin particles with the inert gas. In this case, the foamed aromatic polyester-based resin particles may be impregnated with the inert gas before they are filled into the mold. However, the foamed aromatic polyester-based resin particles may be first filled into the mold, and then the mold filled with the foamed aromatic polyester-based resin particles may be placed in an inert gas atmosphere to impregnate the foamed aromatic polyester-based resin particles with the inert gas.

The temperature when the foamed aromatic polyester-based resin particles are impregnated with the inert gas is preferably 5° C. to 40° C., and more preferably 10° C. to 30° C.

The pressure when the foamed aromatic polyester-based resin particles are impregnated with the inert gas is preferably 0.2 MPa to 2.0 MPa, and more preferably 0.25 MPa to 1.5 MPa. When the inert gas is carbon dioxide, the pressure is preferably 0.2 MPa to 1.5 MPa, and more preferably 0.25 MPa to 1.2 MPa.

The time during which the foamed aromatic polyester-based resin particles are impregnated with the inert gas is preferably 10 minutes to 72 hours, more preferably 15 minutes to 64 hours, and particularly preferably 20 minutes to 48 hours.

The foamed aromatic polyester-based resin particles impregnated with the inert gas are foamed (pre-foamed), for example, by heating to 55° C. to 90° C., thereby producing pre-foamed particles.

A composite structural component can be produced by using the foam molded product as a core, stacking a skin material on the surface of the foam molded product, and integrating the skin material therewith. The composite structural component including the foam molded product and the skin material stacked on and integrated with the surface of the foam molded product is also an aspect of the present invention. The thickness of the foam molded product used as the core of the composite structural component is preferably 1 mm to 40 mm in terms of strength, weight, and shock resistance.

No particular limitation is imposed on the skin material, and examples thereof include fiber-reinforced synthetic resin sheets, metal sheets, and synthetic resin sheets. The skin material is preferably a fiber-reinforced synthetic resin sheet because of its high mechanical strength and light weight.

The fiber-reinforced synthetic resin sheet is a sheet obtained by bonding the fibers with each other through a matrix resin. No particular limitation is imposed on the fibers constituting the fiber-reinforced synthetic resin sheet, and examples thereof may include carbon fibers, glass fibers, aramid fibers, boron fibers, and metal fibers. The fibers are preferably carbon fibers, glass fibers, or aramid fibers because of their high mechanical strength and high heat resistance, and carbon fibers are more preferred.

The matrix resin constituting the fiber-reinforced synthetic resin may be a thermosetting resin or a thermoplastic resin. Examples of the thermosetting resin may include epoxy resins, unsaturated polyester resins, and phenolic resins. Only one type of thermosetting resin may be used, or a combination of two or more types thereof may be used. Examples of the thermoplastic resin may include polyamides (nylon 6, nylon 66, etc.), polyolefins (polyethylene, polypropylene, etc.), polyphenylene sulfide, polyethylene terephthalate, polybutylene terephthalate, polycarbonate, polystyrene, ABS, and a copolymer of acrylonitrile and styrene. Only one type of thermoplastic resin may be used, or a combination of two or more types may be used.

The thickness of the fiber-reinforced synthetic resin sheet is preferably 0.2 mm to 2.0 mm in terms of strength, weight, and shock resistance.

No particular limitation is imposed on the method of producing the composite structural component, and examples thereof may include a method in which the skin material is stacked on and integrated with the surface of the foam molded product used as the core with an adhesive, and methods generally used for molding of the fiber-reinforced synthetic resin sheet. Examples of the method of molding the fiber-reinforced synthetic resin sheet may include an autoclave method, a hand lay-up method, a spray-up method, a PCM (Prepreg Compression Molding) method, an RTM (Resin Transfer Molding) method, and a VaRTM (Vacuum-assisted Resin Transfer Molding) method.

Such a composite structural component is useful for applications such as automobile components, aircraft components, railroad car components, and building materials. Examples of the automobile components may include door panels, door inner components, bumpers, fenders, fender supports, engine covers, roof panels, trunk lids, floor panels, center tunnels, and crash boxes. For example, when the composite structural component is used for a door panel conventionally produced from a steel plate, the door panel can be significantly reduced in weight while substantially the same stiffness as that of the steel plate-made door panel is ensured, so that a high effect of reducing the weight of the automobile can be achieved.

EXAMPLES

An embodiment of the present invention will be described in more detail below with reference to Examples and the like; however, the present invention is not limited thereto.

The methods for specifying various physical properties and the like in the Examples etc. are described below.

Bulk Density

The bulk density was measured according to JIS K6911: 1995 "Testing methods for thermosetting plastics." Specifically, the measurement was performed using an apparent density meter according to JIS K6911.

Bulk density (g/cm$^3$) of foamed particles=[mass (g) of measuring cylinder containing sample−mass (g) of measuring cylinder]/[volume (cm$^3$) of measuring cylinder]

Crystallinity

The crystallinity was measured by the methods described in JIS K7122: 1987 and JIS K7122: 2012. However, the sampling method and temperature conditions were carried out as follows. Samples were collected from the surface layer and center of the foamed particles. The sample of the surface layer was collected in a portion within a range of 20'% in the radial direction of the foamed particles from the surface of the foamed particles cut into approximately two equal parts using a razor blade at the center of the foamed particles. Similarly, the sample of the central portion was collected in a portion within a range of 20, in the radial direction of the foamed particles from the center of the foamed particles cut into two equal parts.

After an aluminum measuring container was filled with 5.5±0.5 mg of sample so that there was no gap at the bottom, the container was covered with an aluminum lid. Then, differential scanning calorimetry was performed using a differential scanning calorimeter (DSC7000X, AS-3, produced by Hitachi High-Tech Science Co., Ltd.). Under a nitrogen gas flow rate of 20 mL/min, the sample was heated by the following steps to obtain a DSC curve.

(Step 1)

Holding at 30° C. for 2 minutes.

(Step 2)

Heating at a rate of 10° C./min from 30° C. to 290° C. Alumina was used as a reference material in this step. The difference between the heat of fusion (J/g) obtained from the area of the melting peak and the heat of crystallization (J/g) obtained from the area of the crystallization peak was determined. A ratio obtained by dividing this difference by the theoretical heat of fusion of perfect crystalline polyethylene terephthalate 140.1 J/g was defined as crystallinity. The heat of fusion and the heat of crystallization were calculated using analysis software attached to the equipment. Specifically, the heat of fusion was calculated from a portion surrounded by a straight line connecting a point at which the DSC curve departs from the low-temperature baseline and a point at which the DSC curve returns to the high-temperature baseline again, and the DSC curve. The heat of crystallization was calculated from the area of a portion surrounded by a straight line connecting a point at which the DSC curve departs from the low-temperature baseline and a point at which the DSC curve returns to the high-temperature side again, and the DSC curve. That is, the crystallinity was determined by the following formula.

Crystallinity (%)=(heat of fusion (J/g)−heat of crystallization (J/g))/140.1 (J/g)×100

Crystallinity Ratio

The crystallinity ratio was determined by the following formula.

Crystallinity ratio=crystallinity (%) of surface layer of foamed particles/crystallinity (%) of central portion of foamed particles Average Cell Diameter The surface layer and central portion of a cross section obtained by dividing the central portion of the foamed particles into approximately two parts were photographed with a scanning electron microscope (SU1510, produced by Hitachi High-Technologies Corporation) at a magnification of 100×. A portion within a range of 20% in the radial direction of the foamed particles from the surface of the foamed particles was defined as the surface layer, and similarly a portion within a range of 20% in the radial direction of the foamed particles from the center of the foamed particles was defined as the central portion.

The photographed microscopic images were arranged so that two images were aligned on one sheet of horizontal A4 paper, and printed on A4 paper.

Three arbitrary straight lines (length: 60 mm) parallel to the vertical and horizontal directions were drawn for one image of the printed foamed particle cross-section. That is, six arbitrary straight lines were drawn in the vertical direction and six lines in the horizontal direction for two microscopic images. The straight lines were drawn so that they was not in contact with cells only at the point of contact as far as possible. The number of cells through which the straight lines passed was counted. Cells in contact with the straight lines only at the point of contact were also counted. The number of cells counted in each direction was obtained by arithmetically averaging the number of cells counted for the six arbitrary straight lines in each of the vertical and horizontal directions. The average chord length t of the cells was calculated by the following formula from the magnification of the image in which the number of cells was counted, and the counted number of cells.

Average chord length $t$ (mm)=60/(number of cells×image magnification)

The image magnification was obtained by measuring the scale bar on the image to 1/100 mm with a Digimatic Caliper, produced by Mitutoyo Corporation, and using the following formula.

Image magnification=measured value (mm) of scale bar/displayed value (mm) of scale bar Then, the cell diameters in the vertical and horizontal directions were calculated by the following formula.

Cell diameter $D$ (mm) in vertical or horizontal direction=$t$/0.616

Furthermore, the square root of the product of the cell diameter D in the vertical direction and the cell diameter D in the horizontal direction was defined as the cell diameter.

Cell diameter (μm)=1000×(vertical $D$×horizontal $D$)$^{1/2}$

The above operation was performed for the surface layers and the central portions of 10 samples, and the average value was taken as the average cell diameter.

Average Cell Diameter Ratio

The average cell diameter ratio was determined by the following formula.

Average cell diameter ratio=average cell diameter (μm) of surface layer of foamed particles/average cell diameter (μm) of central portion of foamed particles Thickness of Surface Resin The surface layer of a cross section divided into approximately two parts at the center of the foamed particles was photographed at a magnification of 500× using a scanning electron microscope (SU1510, produced by Hitachi High-Technologies Corporation). Five straight lines perpendicular to the tangent line were drawn in the radial direction of the foamed particles at arbitrary positions on the surface of the foamed particles in the microscopic image, and the distance from the surface to the first contact cell was measured for each straight line. That is, five distances were measured for one cross-sectional image. Each of the above operations was performed for 10 samples, and the average value was taken as the thickness (μm) of the surface resin.

Moldability Evaluation

The moldability was evaluated according to the following criteria.

A: The foamed particles were heat-fused to each other, firmly bonded to each other, and integrated.

B: The foamed particles were not bonded to each other, and the foamed particles were in a state of easily falling off.

Density of Foam Molded Product

The mass (a) and volume (b) of a rectangular parallelepiped test piece (e.g., 75 mm×300 mm×30 mm) cut out from a foam molded product (dried at 55° C. for 20 hours or more after molding) were measured to three or more significant digits, and the density (g/cm$^3$) of the foam molded product was determined by the formula (a)/(b).

Bending Test: Maximum Bending Strength and Flexural Modulus

The maximum bending strength and flexural modulus were measured according to JIS K7221-1: 2006. Specifically, the maximum bending strength was measured by using a universal testing machine (Autograph AG-X plus 100 kN, produced by Shimadzu Corporation) and universal testing machine data processing software (TRAPEZIUM X, produced by Shimadzu Corporation). A test piece of 25 mm in width, 130 mm in length, and 20 mm in thickness was cut out from a foam molded product (dried at 55° C. for 20 hours or more after molding). The number of test pieces was 5. The test pieces were conditioned for 16 hours under a class 2 standard atmosphere with the symbol "23/50" of JIS K 7100: 1999 (temperature: 23° C., relative humidity: 50%) and then used for measurement under the same standard atmosphere. The test speed was 10 mm/min. The radius of the tip of the pressure wedge and the supporting point was 5R, and the distance between the supporting points was 100 mm. From the obtained graph, a load region in which the inclination becomes maximum was set, and the apparent flexural modulus was determined by the universal testing machine data processing software. The point of intersection between the straight line of this modulus and the stroke was taken as the origin of elongation, and the corresponding maximum bending strength was automatically calculated.

Compression Test: 5% Compressive Strength and Compressive Modulus

The 5% compressive strength and compressive modulus were measured according to JIS K6767: 1999. Specifically, the 5% compressive strength was measured by using a universal testing machine (Autograph AG-X plus 100 kN, produced by Shimadzu Corporation) and universal testing machine data processing software (TRAPEZIUM X, produced by Shimadzu Corporation). The size of the test piece was 50 mm×50 mm×25 mm in thickness, and the number of test pieces was 3. The test pieces were conditioned for 16 hours under a class 2 standard atmosphere with the symbol "23/50" of JIS K 7100: 1999 (temperature: 23° C., relative humidity: 50%) and then used for measurement under the same standard atmosphere. The compression speed was 2.5 mm/min. From the obtained graph, a load region in which the inclination becomes maximum was set, and the compressive modulus was determined by the universal testing machine data processing software. The point of intersection between the straight line of this modulus and the stroke was taken as the origin of elongation, and the compressive strength at 5% compression ratio was automatically calculated.

Evaluation of Mechanical Properties of Molded Articles

The mechanical properties of the molded articles were evaluated according to the following criteria.

A: a maximum bending strength of 1.20 MPa or more and a 5% compressive strength of 0.70 MPa or more.

B: a maximum bending strength of less than 1.20 MPa or a 5% compressive strength of less than 0.70 MPa.

Example 1

Foamed Particle Production Step

The production apparatus shown in FIGS. 1 and 2 was used to produce foamed particles. First, a polyethylene terephthalate composition containing 100 parts by mass of plant-derived polyethylene terephthalate (intrinsic viscosity: 0.80, density: 1,400 kg/m$^3$, melting point: 247.2° C., glass transition temperature: 78.7° C., mass average molecular weight: 74,000, biobased product content: 30%), 1.8 parts by mass of a master batch prepared by adding talc to polyethylene terephthalate (content of polyethylene terephthalate: 60% by weight, content of talc: 40% by weight, intrinsic viscosity of polyethylene terephthalate: 0.82), and 0.22 parts by mass of pyromellitic anhydride was supplied to a single-screw extruder having an opening diameter of 65 mm and an L/D ratio of 34 and melted and kneaded at 300° C.

Next, butane including 35% by weight of isobutane and 65% by weight of n-butane was injected as a foaming agent, in an amount of 1.15 parts by mass based on 100 parts by mass of polyethylene terephthalate, from a mid-section of the extruder into the molten polyethylene terephthalate composition and was uniformly dispersed in the polyethylene terephthalate.

Then, the molten polyethylene terephthalate composition was cooled to 280° C. at the front end portion of the extruder, and the cooled polyethylene terephthalate composition was extrusion-foamed through the respective nozzles of the multi-nozzle die 1 attached to the front end of the extruder. The rate of extrusion of the polyethylene terephthalate composition was 30 kg/h.

The multi-nozzle die 1 had 20 nozzles each having an outlet port 11 with a diameter of 1 mm, and all the outlet ports 11 of the nozzles were disposed at regular intervals on a virtual circle A assumed to be present on the front end face 1*a* of the multi-nozzle die 1 and having a diameter of 139.5 mm.

Two rotary blades 5 were disposed integrally with the outer circumferential surface of the rear end portion of the rotation shaft 2 with a phase difference of 1800 in the circumferential direction of the rotation shaft 2. The respective rotary blades 5 were configured so as to move on the virtual circle A while being always in contact with the front end face 1*a* of the multi-nozzle die 1.

The cooling component 4 had a cooling drum 41 having a front section 41*a* with a circular front shape and a tubular circumferential wall section 41*b* extending rearward from the outer circumferential edge of the front section 41*a* and having an inner diameter of 320 mm. Cooling water 42 at 25° C. was supplied to the cooling drum 41 through the supply tube 41*d* and the supply port 41*c* of the cooling drum 41. The volume of the cooling drum 41 was 17,684 cm$^3$.

The cooling water 42 flows forward while the cooling water 42 is caused to describe a helix along the inner circumferential surface of the circumferential wall section 41*b* of the cooling drum 41 by the centrifugal force caused by the flow rate of the cooling water 42 when it is supplied from the supply tube 41*d* to the inner circumferential surface of the circumferential wall section 41*b* of the cooling drum 41. While flowing along the inner circumferential surface of the circumferential wall section 41*b*, the cooling water 42 spread gradually in a direction perpendicular to its flowing direction, so that the portion of the inner circumferential surface of the circumferential wall section 41*b* that was frontward of the supply port 41*c* of the cooling drum 41 was entirely covered with the cooling water 42.

The rotary blades 5 disposed on the front end face 1*a* of the multi-nozzle die 1 were rotated at a rotation speed of 3,200 rpm, and the extrudates of the polyethylene terephthalate extrusion-foamed through the outlet ports 11 of the respective nozzles of the multi-nozzle die 1 were cut by the rotary blades 5 to thereby produce substantially spherical particle-shaped cut products. The extrudates of the polyethylene terephthalate had unfoamed portions formed immediately after extrusion from the nozzles of the multi-nozzle die 1 and foamed portions that were continuous with the unfoamed portions and were being foamed. The extrudates of the polyethylene terephthalate were cut at the opening edges of the outlet ports 11 of the nozzles, and the cutting of the extrudates of the polyethylene terephthalate was performed at their unfoamed portions.

To produce the foamed polyethylene terephthalate particles, first, the rotation shaft 2 was not attached to the multi-nozzle die 1, and the cooling component 4 was evacuated from the multi-nozzle die 1. In this state, extrudates of the polyethylene terephthalate were extrusion-foamed from the extruder to check that the extrudates of the polyethylene terephthalate had unfoamed portions formed immediately after extrusion from the nozzles of the multi-nozzle die 1 and foamed portions that were continuous with the unfoamed portions and were being foamed. Then, the rotation shaft 2 was attached to the multi-nozzle die 1, and the cooling component 4 was disposed in a prescribed position. Then, the rotation shaft 2 was rotated to cut the extrudates of the polyethylene terephthalate by the rotary blades 5 at the opening edges of the outlet ports 11 of the nozzles, whereby particle-shaped cut products were produced.

The cutting stress by the rotary blades 5 caused the particle-shaped cut products to fly outward or forward. Then, the particle-shaped cut products collided with the cooling water 42 flowing along the inner surface of the cooling drum 41 of the cooling component 4 in a direction oblique to the surface of the cooling water 42 so as to follow the cooling water 42 from the upstream side of the flow of the cooling water 42 toward the downstream side. The particle-shaped cut products then entered the cooling water 42 and were cooled immediately, whereby foamed polyethylene terephthalate particles for in-mold foam molding were produced.

The obtained foamed polyethylene terephthalate particles were discharged together with the cooling water 42 through the discharge port 41*e* of the cooling drum 41 and then separated from the cooling water 42 by a dewaterer.

Molding Step

The obtained foamed polyethylene terephthalate particles were left to stand at 23° C. and atmospheric pressure for 30 days immediately after production. Thereafter, the particles were placed in a molding die of 30 mm×300 mm×400 mm, heated with water vapor at 0.05 MPa for 180 seconds and water vapor at 0.10 MPa for 30 seconds, and then cooled until the maximum surface pressure of the foam molded product was reduced to 0.01 MPa, thereby obtaining a foam molded product.

Example 2

Foamed particles and a foam molded product were obtained in the same manner as in Example 1, except for using a thermoplastic polyester-based resin composition containing 100 parts by mass of a thermoplastic polyester-based resin containing 95% by weight of polyethylene terephthalate (intrinsic viscosity: 0.82, density: 1,400 kg/m$^3$, melting point: 248.0° C., glass transition temperature: 78.7° C., mass average molecular weight: 72,000) and 5% by weight of polyethylene naphthalate (density: 1,330 kg/m$^3$, melting point: 264.2° C., glass transition temperature: 119.8° C.), 1.8 parts by mass of a master batch prepared by adding talc to polyethylene terephthalate (content of polyethylene terephthalate: 60% by weight, content of talc: 40% by weight, intrinsic viscosity of polyethylene terephthalate: 0.82), and 0.24 parts by mass of pyromellitic anhydride.

Example 3

Foamed particles and a foam molded product were obtained in the same manner as in Example 1, except for using a thermoplastic polyester-based resin composition containing 100 parts by mass of a thermoplastic polyester-based resin containing 95% by weight of recovered polyethylene terephthalate (intrinsic viscosity: 0.80, density: 1,400 kg/m$^3$, melting point: 248.3° C., glass transition temperature: 78.9° C., mass average molecular weight: 78,000) and 5% by weight of polyethylene naphthalate (density: 1,330 kg/m$^3$, melting point: 264.2° C., glass transition temperature: 119.8° C.), 0.5 parts by mass of a master batch prepared by adding talc to polyethylene terephthalate (content of polyethylene terephthalate: 60% by weight, content of talc: 40% by weight, intrinsic viscosity of polyethylene terephthalate: 0.82), 3.3 parts by mass of a master batch prepared by adding carbon black to polyethylene terephthalate (content of polyethylene terephthalate: 70% by weight, content of carbon black: 30% by weight, intrinsic viscosity of polyethylene terephthalate: 0.82), and 0.26 parts by mass of pyromellitic anhydride.

Example 4

Foamed Particle Production Step

Foamed particles were obtained in the same manner as in Example 1, except that carbon dioxide was injected, in an amount of 0.3 parts by mass based on 100 parts by mass of polyethylene terephthalate, from a mid-section of the extruder into the molten polyethylene terephthalate composition and was uniformly dispersed in the polyethylene terephthalate.

Molding Step

After the obtained foamed polyethylene terephthalate particles were left to stand at 23° C. and atmospheric pressure for 1 day immediately after production, the particles were sealed in a pressure container, and compressed air was injected up to 0.5 MPa (gauge pressure) into the pressure container. The particles were left to stand at a temperature in the pressure container of 20° C., and pressure aging was performed for 24 hours. After being taken out from the container, the particles were placed in a molding die of 30 mm×300 mm×400 mm, heated with water vapor at 0.05 MPa for 180 seconds and water vapor at 0.10 MPa for 30 seconds, and then cooled until the maximum surface pressure of the foam molded product was reduced to 0.01 MPa, thereby obtaining a foam molded product.

Example 5

Foamed particles and a foam molded product were obtained in the same manner as in Example 1, except that the temperature of cooling water was set to 45° C.

Comparative Example 1

Foamed particles and a foam molded product were obtained in the same manner as in Example 1, except that the temperature of cooling water was set to 60° C.

Comparative Example 2

Foamed particles and a foam molded product were obtained in the same manner as in Example 1, except that the temperature of cooling water was set to 10° C.

Comparative Example 3

Foamed particles and a foam molded product were obtained in the same manner as in Example 1, except that the temperature of cooling water was set to 20° C.

Comparative Example 4

Foamed Particle Production Step

An underwater cutting granulator was used, which had a diverter valve and a die provided with five die holes each having a diameter of 2.0 mm and a land length of 2.0 mm, and which was set with the diverter valve so as to discharge a molten polyethylene terephthalate resin supplied from an extruder to the die through a resin flow path on the external discharge side of the diverter valve to the outside of the granulator. Further, an underwater cutting granulator equipped with a single-screw extruder having an opening diameter of 65 mm and an L/D ratio of 34, to which the die was attached, was used.

First, the temperature of the die holes of the die was adjusted to 300° C. using a heater, and the temperature of the extruder was adjusted. Specifically, the upstream extruder was set at a higher temperature than the downstream extruder to increase the solubility of the foaming agent, and the temperature of the extruder was set so that the molten resin was finally supplied at a resin temperature of 290° C. to the die.

The same polyethylene terephthalate composition as the one used in Example 1 was supplied at a rate of 30 kg/h to the extruder, and melted and kneaded.

Thereafter, butane including 35% by weight of isobutane and 65% by weight of n-butane was injected as a foaming agent, in an amount of 3.0 parts by mass based on 100 parts by mass of polyethylene terephthalate, into the extruder, and the molten polyethylene terephthalate composition was melted and kneaded, supplied to the die, and discharged to the outside of the granulator through the resin flow path of the diverter valve.

When the temperature of the extruder, the pressure of the foaming agent, and the like were stabilized, a cutter was operated in a chamber mounted in front of the die, the flow path of the molten polyethylene terephthalate composition was switched by the diverter valve, and circulation water at 80° C. having a water pressure of 0.3 MPa was circulated in the chamber at 12 $m^3$/h to start granulation.

Extrudates of the molten polyethylene terephthalate extruded in the circulating water while foaming were cut with rotary blades to produce foamed particles. The particle-shaped cut products were foamed in the circulating water to produce foamed polyethylene terephthalate particles. The circulating water containing the foamed particles was transferred from the chamber to a centrifugal dryer, where the water was removed from the foamed particles.

Molding Step

The obtained foamed polyethylene terephthalate particles were left to stand at 23° C. and atmospheric pressure for 30 days immediately after production. Then, the particles were placed in a molding die of 30 mm×300 mm×400 mm, and heated with water vapor at 0.05 MPa for 180 seconds and water vapor at 0.10 MPa for 30 seconds; however, molding was impossible.

Comparative Example 5

Foamed Particle Production Step

Foamed particles were obtained in the same manner as in Comparative Example 4, except that butane including 35% by weight of isobutane and 65% by weight of n-butane was injected as a foaming agent, in an amount of 2.2 parts by mass based on 100 parts by mass of polyethylene terephthalate, into the molten polyethylene terephthalate composition and was uniformly dispersed in the polyethylene terephthalate.

Molding Step

The molding step was performed in the same manner as in Comparative Example 4; however, molding was impossible.

FIGS. 4 to 7 show scanning electron microscope (SEM) images of cross-sections of the foamed particles obtained in the Examples and Comparative Examples. Further, Tables 1 and 2 show physical properties measured for the foamed particles and foam molded products obtained in the Examples and Comparative Examples.

TABLE 1

| | | | | Ex. 1 | | Ex. 2 | | Ex. 3 | | Ex. 4 | | Ex. 5 | |
|---|---|---|---|---|---|---|---|---|---|---|---|---|---|
| Production method | Granulation method | | | Water ring hot cutting | | Water ring hot cutting | | Water ring hot cutting | | Water ring hot cutting | | Water ring hot cutting | |
| | Water temperature | | ° C. | 25 | | 25 | | 25 | | 25 | | 45 | |
| Foamed particles | Bulk density | | g/cm$^3$ | 0.140 | | 0.140 | | 0.140 | | 0.155 | | 0.140 | |
| | Thermal properties | | | Surface layer | Central portion | Surface layer | Central portion | Surface layer | Central portion | Surface layer | Central portion | Surface layer | Central portion |
| | | Crystallinity | % | 3.1 | 6.4 | 3.2 | 6.3 | 3.6 | 4.1 | 3.4 | 3.0 | 4.0 | 6.6 |
| | | Crystallinity ratio (B/A) | | 0.48 | | 0.51 | | 0.88 | | 1.13 | | 0.61 | |
| | Average cell diameter | | | Surface layer | Central portion | Surface layer | Central portion | Surface layer | Central portion | Surface layer | Central portion | Surface layer | Central portion |
| | | | μm | 135 | 163 | 155 | 170 | 169 | 180 | 161 | 180 | 170 | 192 |
| | Average cell diameter ratio (D/C) | | | 0.83 | | 0.91 | | 0.94 | | 0.89 | | 0.89 | |
| | Thickness of surface resin layer | | μm | 17.7 | | 19.8 | | 27.6 | | 22.0 | | 14.9 | |
| Foam molded product | Moldable/unmoldable | | — | A | | A | | A | | A | | A | |
| | Density | | g/cm$^3$ | 0.150 | | 0.150 | | 0.150 | | 0.160 | | 0.150 | |
| | Bending | Maximum bending strength | MPa | 1.43 | | 1.54 | | 1.52 | | 1.22 | | 1.40 | |
| | | Modulus | MPa | 41.9 | | 42.6 | | 36.6 | | 35.4 | | 39.8 | |
| | Compression | 5% compressive strength | MPa | 1.00 | | 1.01 | | 0.88 | | 0.75 | | 0.98 | |
| | | Modulus | MPa | 33.2 | | 35.8 | | 27.5 | | 24.6 | | 31.6 | |

TABLE 1-continued

| | | Ex. 1 | Ex. 2 | Ex. 3 | Ex. 4 | Ex. 5 |
|---|---|---|---|---|---|---|
| Evaluation of physical properties of molded article | — | A | A | A | A | A |

TABLE 2

| | | | | Comp. Ex. 1 | | Comp. Ex. 2 | | Comp. Ex. 3 | | Comp. Ex. 4 | | Comp. Ex. 5 | |
|---|---|---|---|---|---|---|---|---|---|---|---|---|---|
| Production method | Granulation method | | | Water ring hot cutting | | Water ring hot cutting | | Water ring hot cutting | | Underwater cutting | | Underwater cutting | |
| | Water temperature | | ° C. | 60 | | 10 | | 20 | | 80 | | 80 | |
| Foamed particles | Bulk density | | g/cm$^3$ | 0.140 | | 0.140 | | 0.140 | | 0.150 | | 0.210 | |
| | Thermal properties | | | Surface layer | Central portion | Surface layer | Central portion | Surface layer | Central portion | Surface layer | Central portion | Surface layer | Central portion |
| | | Crystallinity | % | 6.9 | 4.8 | 2.0 | 7.2 | 2.2 | 7.8 | 13.9 | 8.0 | 6.7 | 3.3 |
| | | Crystallinity ratio | (B/A) | 1.44 | | 0.28 | | 0.28 | | 1.74 | | 2.03 | |
| | Average cell diameter | | | Surface layer | Central portion | Surface layer | Central portion | Surface layer | Central portion | Surface layer | Central cortior | Surface layer | Central portion |
| | | | μm | 201 | 208 | 140 | 198 | 143 | 210 | 182 | 245 | 259 | 355 |
| | Average cell diameter ratio (D/C) | | | 0.97 | | 0.71 | | 0.68 | | 0.74 | | 0.73 | |
| | Thickness of surface resin layer | | μm | 4.7 | | 48.6 | | 43.9 | | 44.3 | | 53.4 | |
| Foam molded product | Moldiable/unmoldable | | — | A | | A | | ○ | | B | | B | |
| | Density | | g/cm$^3$ | 0.150 | | 0.150 | | 0.150 | | — | | — | |
| | Bending | Maximum bending strength | MPa | 1.10 | | 0.12 | | 1.16 | | — | | — | |
| | | Modulus | MPa | 31.2 | | 33.0 | | 34.5 | | — | | — | |
| | Compression | 5% compressive strength | MPa | 0.62 | | 0.63 | | 0.68 | | — | | — | |
| | | Modulus | MPa | 21.6 | | 22.8 | | 24.4 | | — | | — | |
| | Evaluation of physical properties of molded article | | — | B | | B | | B | | — | | — | |

Because the crystallinity ratio of the foamed particles of Comparative Example 1 was high, it was assumed that the secondary foaming properties were poor, and that the mechanical characteristics of the foam molded product were low. Moreover, because the crystallinity ratio of the foamed particles of Comparative Examples 2 and 3 was low, it was assumed that the secondary foaming properties were poor, and that the mechanical characteristics of the foam molded products were low. Further, because the central portion and surface layer of the foamed particles of Comparative Examples 4 and 5 had high crystallinity and further had a high crystallinity ratio, it was assumed that the secondary foaming properties were very poor, thus failing to perform foam molding.

Furthermore, the resin layer on the surface of the foamed particles of Comparative Example 1 was thin (cross-sectional photographs). This was assumed to be because the cooling water temperature was as high as 60° C. The resin layer on the surface of the foamed particles of Comparative Examples 2 and 3 was thick (cross-sectional photographs). This was assumed to be because the cooling water temperatures were as low as 10° C. and 20° C. The resin layer on the surface of the foamed particles of Comparative Examples 4 and 5 was thick (cross-sectional photographs). This was assumed to be because the foamed particles were rapidly cooled in the underwater cutting method.

On the other hand, the foam molded products obtained from the foamed particles of Examples 1 to 5 showed more excellent physical properties in both the bending test and compression test than the Comparative Examples. This is assumed to be because by setting the cooling water temperature within an appropriate range in the water ring hot cutting method, the crystallinity of the central portion and surface layer of the foamed particles can be adjusted within an appropriate range, and/or the thickness of the resin layer on the surface can be appropriately adjusted.

In Examples 1 to 3, the foamed particles and foam molded products of the present invention were obtained, even though the aromatic polyester-based resin was a plant-derived material, a petroleum-derived material, or a recycled material. In Example 4, the foamed particles and foam molded product of the present invention were obtained, even though the foaming agent was an inorganic gas.

REFERENCE SIGNS LIST

1. Nozzle die
2. Rotation shaft
3. Driving component
4. Cooling component
41. Cooling drum
42. Cooling water
5. Rotary blade
P. Foamed aromatic polyester-based resin particles for in-mold foam molding

The invention claimed is:

1. Foamed aromatic polyester-based resin particles, wherein crystallinity (A) in a particle central portion and crystallinity (B) in a particle surface layer are both 10% or less, and a ratio of the crystallinity in the surface layer to the crystallinity in the central portion (B/A) is 0.30 to 1.40.

2. The foamed aromatic polyester-based resin particles according to claim 1, wherein a resin layer of the particle surface has a thickness of 5 μm to 40 μm.

3. The foamed aromatic polyester-based resin particles according to claim 1, wherein an average cell diameter (C) in the particle central portion and an average cell diameter (D) in the particle surface layer are both 50 μm to 300 μm, and a ratio of the average cell diameter in the surface layer to the average cell diameter in the central portion (D/C) is 0.75 to 0.95.

4. The foamed aromatic polyester-based resin particles according to claim 1, wherein the ratio of the crystallinity in the surface layer to the crystallinity in the particle central portion (B/A) is 0.30 to 1.30.

5. The foamed aromatic polyester-based resin particles according to claim 1, wherein the crystallinity (A) in the particle central portion and the crystallinity (B) in the particle surface layer are both 1 to 10%.

6. A foam molded product of the foamed aromatic polyester-based resin particles according to claim 1.

7. The foam molded product according to claim 6, which has a density of 0.05 g/cm$^3$ to 0.7 g/cm$^3$.

8. An automobile component comprising the foam molded product according to claim 6.

* * * * *